(12) United States Patent
Cho et al.

(10) Patent No.: US 10,568,144 B2
(45) Date of Patent: Feb. 18, 2020

(54) TIMING ESTIMATION METHOD OF RANDOM ACCESS PREAMBLE, RANDOM ACCESS PREAMBLE DETECTION METHOD, AND RANDOM ACCESS PREAMBLE DETECTION APPARATUS

(71) Applicant: ELECTRONICS AND TELECOMMUNICATIONS RESEARCH INSTITUTE, Daejeon (KR)

(72) Inventors: Seong Chul Cho, Daejeon (KR); Hyung Jin Kim, Daejeon (KR); Gweon Do Jo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 22 days.

(21) Appl. No.: 15/954,422

(22) Filed: Apr. 16, 2018

(65) Prior Publication Data
US 2019/0150199 A1    May 16, 2019

(30) Foreign Application Priority Data

Nov. 13, 2017    (KR) .................. 10-2017-0150731

(51) Int. Cl.
*H04W 74/08*    (2009.01)
*H04B 1/713*    (2011.01)
(Continued)

(52) U.S. Cl.
CPC ........ *H04W 74/0833* (2013.01); *H04B 1/713* (2013.01); *H04L 5/0012* (2013.01); *H04L 27/26* (2013.01); *H04L 5/0053* (2013.01)

(58) Field of Classification Search
CPC .... H04B 1/713; H04B 7/2121; H04B 7/2123; H04W 74/0833; H04W 72/04;
(Continued)

(56) References Cited

U.S. PATENT DOCUMENTS 10,200,229 B2 *  2/2019  Yu ...................... H04L 27/2647
2009/0175161 A1    7/2009  Yi et al.
(Continued)

FOREIGN PATENT DOCUMENTS

| KR | 1020130058166 A | 6/2013 |
| KR | 1020150045350 A | 4/2015 |
| KR | 1020150097754 A | 8/2015 |

*Primary Examiner* — Robert J Lopata

(57) ABSTRACT

A random access preamble detection method of a base station includes removing a cyclic prefix (CP) from a received signal, detecting a plurality of first symbols corresponding to a plurality of first subcarriers included in an uplink available resource from the received signal with the CP removed, measuring reception power of the first symbol corresponding to each of a plurality of second subcarriers allocated to a random access channel among the plurality of first subcarriers, accumulating reception power with respect to each of the plurality of second subcarriers according to a predetermined frequency hopping pattern, and upon completely accumulating reception power according to the frequency hopping pattern, detecting a preamble sequence using each accumulated value of reception power of each of the plurality of second subcarriers.

20 Claims, 9 Drawing Sheets

(51) Int. Cl.
*H04L 5/00* (2006.01)
*H04L 27/26* (2006.01)

(58) Field of Classification Search
CPC ............... H04W 72/12; H04W 76/00; H04J 2203/0069; H04Q 2213/394
USPC ........................................................ 370/329
See application file for complete search history.

(56) References Cited

U.S. PATENT DOCUMENTS

| | | |
|---|---|---|
| 2010/0074191 A1 | 3/2010 | Lee et al. |
| 2012/0188995 A1* | 7/2012 | Sihlbom ............... H04W 56/00 370/344 |
| 2015/0305014 A1 | 10/2015 | Li et al. |
| 2016/0242132 A1 | 8/2016 | Bae et al. |
| 2017/0094689 A1* | 3/2017 | Lin .................... H04W 72/0453 |
| 2017/0202028 A1 | 7/2017 | Gaal et al. |
| 2017/0223743 A1* | 8/2017 | Lin ......................... H04W 4/80 |
| 2017/0374683 A1* | 12/2017 | Tavares .................. H04L 27/26 |
| 2018/0124836 A1* | 5/2018 | Hong ................. H04W 74/006 |
| 2018/0131547 A1* | 5/2018 | Wang .................. H04L 27/2602 |
| 2018/0279363 A1* | 9/2018 | Su ..................... H04W 74/0833 |
| 2019/0075602 A1* | 3/2019 | Lin ....................... H04L 5/0053 |

\* cited by examiner

TIMING ESTIMATION METHOD OF RANDOM ACCESS PREAMBLE, RANDOM ACCESS PREAMBLE DETECTION METHOD, AND RANDOM ACCESS PREAMBLE DETECTION APPARATUS

CROSS-REFERENCE TO RELATED APPLICATION

This application claims priority to and the benefit of Korean Patent Application No. 10-2017-0150731 filed in the Korean Intellectual Property Office on Nov. 13, 2017, the entire contents of which are incorporated herein by reference.

BACKGROUND OF THE INVENTION

(a) Field of the Invention

An exemplary embodiment of the present invention relates a timing estimation method of a random access preamble, a random access preamble detection method, and a random access preamble detection apparatus, and more particularly, to a timing estimation method of a random access preamble, a random access preamble detection method, and a random access preamble detection apparatus in a narrowband-Internet of things (NB-IoT) system.

(b) Description of the Related Art

A narrowband-Internet of things (NB-IoT) technology is one of Internet of things (IoT) technologies for supporting low power wide area (LPWA) communication through global system for mobile communications (GSM) or a long term evolution (LTE) network. A NB-IoT technology is appropriate for communication between objects that are positioned at a long distance and have low power consumption, such as a water meter reading device and a global positioning device.

A narrowband physical random access channel (NPRACH) that is a physical channel for random access in an NB-IoT system is a physical channel for transmitting a preamble signal to permit a terminal to access a network.

According to the NB-IoT physical layer standard of 3GPP Rel. 13, a NB-IoT system uses a frequency hopping scheme using a single tone to transmit a random access preamble through a NPRACH.

The above information disclosed in this Background section is only for enhancement of understanding of the background of the invention and therefore it may contain information that does not form the prior art that is already known in this country to a person of ordinary skill in the art.

SUMMARY OF THE INVENTION

An exemplary embodiment of the present invention provides a timing estimation method of a random access preamble, a random access preamble detection method, and a random access preamble detection apparatus having advantages of detecting a random access preamble sequence transmitted using a frequency hopping scheme using a single tone in a narrowband-Internet of things (NB-IoT) system.

According to an embodiment of the present invention, a random access preamble detection method of a base station includes removing a cyclic prefix (CP) from a received signal, detecting a plurality of first symbols corresponding to a plurality of first subcarriers included in an uplink available resource from the received signal with the CP removed, measuring reception power of the first symbol corresponding to each of a plurality of second subcarriers allocated to a random access channel among the plurality of first subcarriers, accumulating reception power with respect to each of the plurality of second subcarriers according to a predetermined frequency hopping pattern, and upon completely accumulating reception power according to the frequency hopping pattern, detecting a preamble sequence using each accumulated value of reception power of each of the plurality of second subcarriers.

The detecting of the plurality of first symbols may include performing fast Fourier transform (FFT) on the received signal with the CP removed therefrom to generate a frequency domain signal corresponding to each of a plurality of symbol periods belonging to one preamble sequence period, combining a plurality of frequency domain signals corresponding to the plurality of symbol periods, and detecting the plurality of first symbols from a signal with which the plurality of frequency domain signals are combined.

The detecting of the plurality of first symbols may include detecting a plurality of first symbol period signals belonging to one preamble sequence period from the received signal with the CP removed therefrom, combining the plurality of first symbol period signals to generate a second symbol period signal, performing FFT on the second symbol period signal to generate a frequency domain signal, and detecting the plurality of first symbol from the frequency domain signal.

The accumulating may include accumulating reception power of each of the plurality of second subcarriers based on subcarrier mapping information of a case in which the first symbol corresponds to an initial symbol group included in a preamble sequence, and mapping the accumulated values of reception power to each of the plurality of second subcarriers based on subcarrier mapping information of a case in which the first symbol corresponds to an initial symbol group included in a preamble sequence.

The method may further include accumulating reception power of a remaining plurality of third subcarriers except for the plurality of second subcarriers among the plurality of first subcarrier according to the frequency hopping pattern, and setting a detection level of the preamble sequence using an accumulated value of reception power of the plurality of third subcarriers.

The method may further include setting a detection level of the preamble sequence using the accumulated value of reception power of the remaining part excluding a plurality of third subcarriers used to transmit the preamble sequence among the plurality of second subcarriers.

The method may further include accumulating power reception of remaining except for the plurality of second subcarriers among the plurality of first subcarriers according to the frequency hopping pattern, and setting a detection level of the preamble sequence using an accumulated value of reception power of a plurality of third subcarrier selected at descending order of the accumulated value of reception power among the plurality of first subcarriers and a plurality of fourth subcarriers that are selected in ascending order of the accumulated value of reception power among the plurality of first subcarriers.

The method may further include resetting a detection level of the preamble sequence depending on the number of preamble sequences that are simultaneously detected in the random access channel.

According to another embodiment of the present invention, a timing estimation method of a random access preamble of a base station includes removing a cyclic prefix (CP) from a received signal, detecting a plurality of first symbols corresponding to a plurality of first subcarriers allocated to a random access channel from the received signal with the CP removed, accumulating reception power of the first symbol corresponding to each of the plurality of first subcarriers according to a frequency hopping pattern, detecting a plurality of second subcarriers allowed to a terminal to transmit a preamble sequence using each of accumulated values of reception power of the plurality of first subcarriers, performing inverse fast Fourier transform (IFFT) using a plurality of third subcarriers used to transmit the preamble sequence among the plurality of second subcarriers, and estimating timing offset of the preamble sequence based on a time domain signal with maximum energy among a plurality of time domain signals generated as a result of the IFFT.

The removing of the CP may include extending a CP period to a portion of a preamble sequence period, and removing the CP from the received signal to correspond to the extended CP period.

The performing of the IFFT may include performing nulling on remaining subcarriers except for the plurality of second subcarriers among the plurality of first subcarriers, and performing the IFFT using a signal value of the plurality of second subcarrier after the nulling is performed.

The estimating may include acquiring energy of each of the plurality of time domain signals generated from the IFFT result and estimating the timing offset using a time period index of a time domain signal with maximum energy among the plurality of time domain signals.

The timing estimation method may further include normalizing a value of at least one fourth subcarrier according to a number of repletion times when the at least one fourth subcarrier is repeatedly used among the plurality of third subcarriers to transmit the preamble sequence.

According to another embodiment of the present invention, a random access preamble detection apparatus includes a cyclic prefix (CP) remover configured to remove a cyclic prefix (CP) from a received signal and to output the received signal, a symbol detector configured to detect a plurality of first symbols corresponding to a plurality of first subcarriers included in an uplink available resource from an output signal of the CP remover, and a preamble detector configured to accumulate reception power with respect to each of a plurality of second subcarriers allocated to a random access channel among the plurality of first subcarriers according to a predetermined frequency hopping pattern and, upon completely accumulating reception power according to the frequency hopping pattern, to detect a preamble sequence using each accumulated value of reception power of each of the plurality of second subcarriers.

The symbol detector may perform fast Fourier transform (FFT) on the received signal with the CP removed therefrom to generate a frequency domain signal corresponding to each of a plurality of symbol periods belonging to one preamble sequence period and detect the plurality of first symbols from a signal formed by combining frequency domain signals corresponding to the plurality of symbol periods.

The symbol detector may combine a plurality of first symbol period signals belonging to one preamble sequence period to generate a second symbol period signal in the received signal with the CP removed therefrom and detect the plurality of first symbol from a frequency domain signal generated by performing FFT on the second symbol period signal.

The preamble detector may accumulate reception power of each of the plurality of second subcarriers based on subcarrier mapping information of a case in which the first symbol corresponds to an initial symbol group included in a preamble sequence and map the accumulated values of reception power to each of the plurality of second subcarriers.

The random access preamble detection apparatus may further include a detection level setting unit configured to accumulate reception power of a remaining plurality of third subcarriers except for the plurality of second subcarriers among the plurality of first subcarrier according to the frequency hopping pattern and to set a detection level of the preamble sequence using an accumulated value of reception power of the plurality of third subcarriers.

The random access preamble detection apparatus may further include a detection level setting unit configured to set a detection level of the preamble sequence using the accumulated value of reception power of the remaining part excluding a plurality of third subcarriers used to transmit the preamble sequence among the plurality of second subcarriers.

The random access preamble detection apparatus may further include a detection level setting unit configured to accumulate reception power of remaining except for the plurality of second subcarriers among the plurality of first subcarriers according to the frequency hopping pattern and to set a detection level of the preamble sequence using an accumulated value of reception power of a plurality of third subcarrier selected at descending order of the accumulated value of reception power among the plurality of first subcarriers and a plurality of fourth subcarriers that are selected in ascending order of the accumulated value of reception power among the plurality of first subcarriers.

The random access preamble detection apparatus may further include a detection level setting unit configured to reset a detection level of the preamble sequence depending on the number of preamble sequences that are simultaneously detected in the random access channel.

According to an exemplary embodiment, detection performance of a random access preamble sequence transmitted using a frequency hopping scheme may be improved using a single tone in a NB-IoT system.

DETAILED DESCRIPTION OF THE EMBODIMENTS

Figure 1:
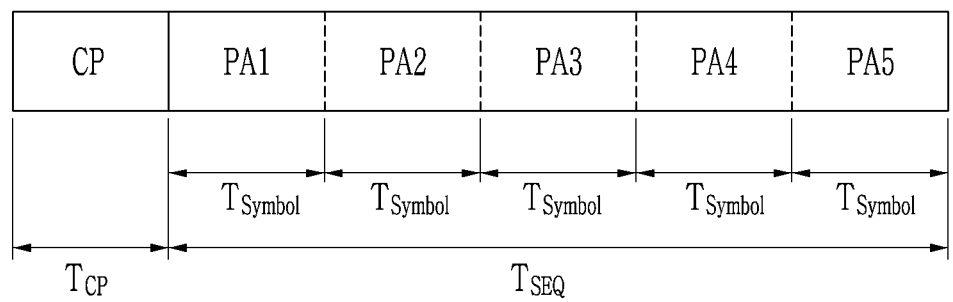
FIG. 1 is a schematic diagram of a structure of a NPRACH in a narrowband-Internet of things (NB-IoT) system.

Exemplary embodiments of the present invention are described in detail so as for those of ordinary skill in the art to easily implement with reference to the accompanying drawings. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification and the claims, unless explicitly described to the contrary, the word "comprise" and variations such as "comprises" or "comprising", will be understood to imply the inclusion of stated elements but not the exclusion of any other elements.

Throughout the specification, a terminal may refer to a mobile terminal (MT), a mobile station (MS), an advanced mobile station (AMS), a high reliability mobile station (HR-MS), a subscriber station (SS), a portable subscriber station (PSS), an access terminal (AT), user equipment (UE), and the like and may include all or some functions of MT, MS, AMS, HR-MS, SS, PSS, AT, UE, and the like.

In addition, a base station (BS) may include an advanced base station (ABS), a high reliability base station (HR-BS), a node B, an evolved node B (eNodeB), an access point (AP), a radio access station (RAS), a base transceiver station (BTS), a mobile multihop relay (MMR)-BS, a relay station (RS) that functions as a base station, a relay node (RN) that functions as a base station, an advanced relay station (ARS) that functions as a base station, a high reliability relay station (HR-RS) that functions as a base station, a small-size base station [a femoto BS, a home node B (HNB), a home eNodeB (HeNB), a pico BS, a metro BS, a micro BS, and the like], and the like and may include all or some of ABS, nodeB, eNodeB, AP, RAS, BTS, MMR-BS, RS, RN, ARS, HR-RS, small base station, and the like.

Hereinafter, prior to description of an exemplary embodiment of the present invention, a method of transmitting a random access preamble in a narrowband-Internet of things (NB-IoT) system will be described in detail.

In a NB-IoT system, a random access preamble sequence is transmitted through a narrowband physical random access channel (NPRACH).

FIG. 1 is a schematic diagram of a structure of a NPRACH in a NB-IoT system.

Referring to FIG. 1, each preamble symbol group in the NPRACH may include a CP period $T_{CP}$ in which a cyclic prefix (CP) signal is transmitted and a preamble sequence period $T_{SEQ}$ including the same five preamble symbol periods $T_{Symbol}$. Here, each preamble symbol period Ts may be a period in which one preamble symbol is transmitted.

The CP period $T_{CP}$ may include 2048*Ts or 8192*Ts according to a preamble format, one symbol period $T_{Symbol}$ may include 8192*Ts, and the preamble sequence period $T_{SEQ}$ may include 5*8192*Ts. Here, Ts may refer to a specific time unit that is 307200×Ts=10 ms. In addition, a preamble format for determination of a length of the CP period $T_{CP}$ may be provided from an L1 control parameter.

Table 1 below shows an example of a random access preamble parameter.

TABLE 1

| Preamble Parameter | | |
|---|---|---|
| Preamble format | $T_{CP}$ | $T_{SEQ}$ |
| 0 | $2048 \cdot T_s$ | $5 \cdot 8192 \cdot T_s$ |
| 1 | $8192 \cdot T_s$ | $5 \cdot 8192 \cdot T_s$ |

Referring to Table 1 above, when an indicator indicating a preamble format is 0, the CP period $T_{CP}$ may include 2048*Ts according to a preamble format and, when an indicator indicating a preamble format is 1, the CP period $T_{CP}$ may include 8192*Ts.

Figure 2:
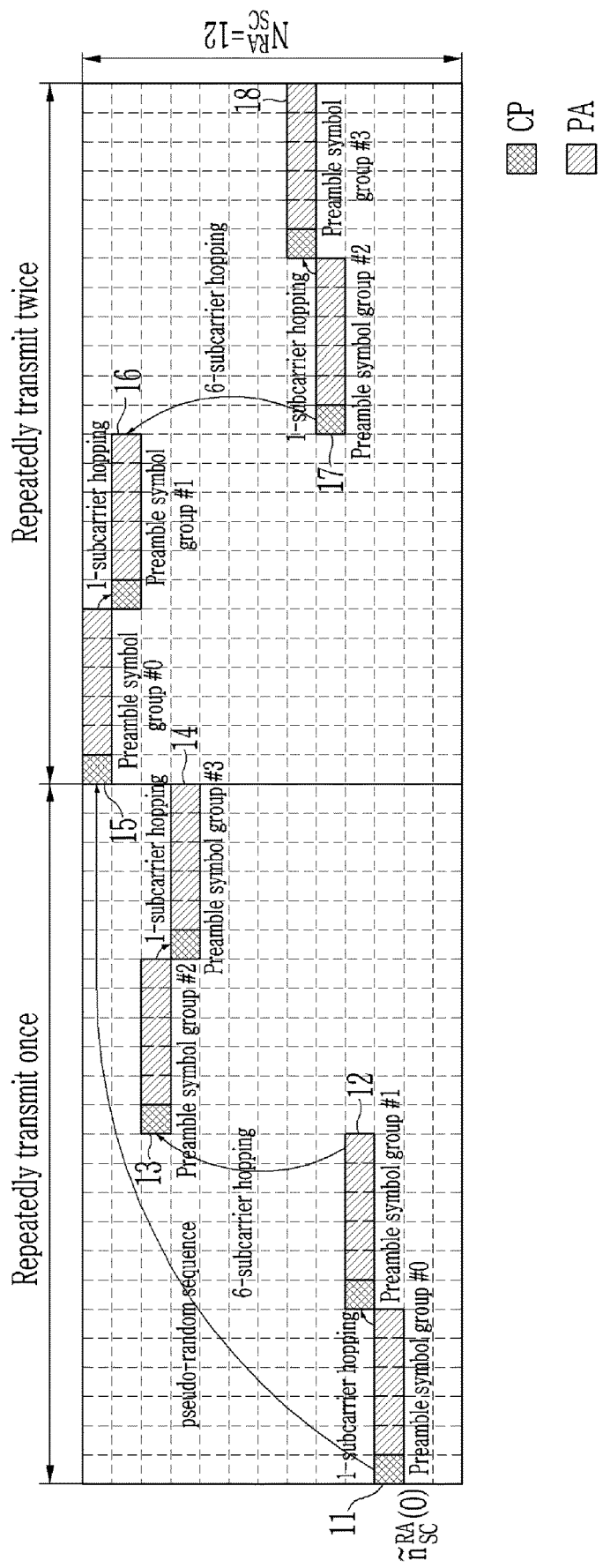
FIG. 2 is a diagram for explanation of a method of transmitting a random access preamble in a NB-IoT system.

FIG. 2 is a diagram for explanation of a method of transmitting a random access preamble in a NB-IoT system and illustrates an example of a case in which a preamble is repeatedly transmitted.

According to the 3GPP standard, transmission of a random access preamble sequence of a NPRACH may be applied only to subcarrier spacing of 3.75 kHz and may be performed using a single tone method using a single subcarrier.

Referring to FIG. 2, a random access preamble sequence of a NPRACH may basically include four preamble symbol groups (preamble symbol groups #0 to #3) transmitted through four slots that are continuously present in a time domain and may be configured by repeating four preamble symbol groups the number of repetition times.

Each preamble symbol group included in the random access preamble sequence may include one CP and five preamble symbols (PAs), as shown in FIG. 1.

In the random access preamble sequence of the NPRACH, a subcarrier index with an initially transmitted preamble symbol group 11 (hereinafter, referred to as an 'initial preamble symbol group') mapped thereto may be provided by a MAC layer. In remaining preamble symbol groups 12 to 18 except for an initial preamble symbol group 11, a position of a subcarrier (hereinafter, referred to as a 'subcarrier index' of a mapped subcarrier may be determined by a frequency hopping pattern.

A hopping pattern of a random access preamble sequence transmitted in a NPRACH by one terminal to perform frequency hopping of corresponding preamble symbol groups 11 to 18 only in $N_{sc}^{RA}$. That is, among 48 subcarriers allocated to a NPRACH, the number of subcarriers to be used to transmit a random access preamble by one terminal may be 12 and may be predetermined by a base station.

In a random access preamble sequence, a subcarrier position $n_{sc}^{RA}(i)$ with an $i^{th}$ preamble symbol group mapped thereto may be determined according to Equation 1 below.

$$n_{sc}^{RA}(i) = n_{start} + \tilde{n}_{SC}^{RA}(i) \qquad \text{[Equation 1]}$$

Here, $n_{start}$ may be calculated according to Equation 2 below.

$$n_{start} = N_{scoffset}^{NPRACH} + \lfloor n_{init}/N_{sc}^{RA} \rfloor \cdot N_{sc}^{RA} \qquad \text{[Equation 2]}$$

In Equation 2 above, $N_{scoffset}^{NPRACH}$ may be a frequency position (index) of a first subcarrier allocated to a NPRACH and may be given by a L1 control parameter. In addition, $n_{init}$ may have one value of $\{0, 1, \ldots, N_{sc}^{NPRACH}-1\}$ and $N_{sc}^{NPRACH}$ may be the number of subcarriers allocated to a NPRACH and may be given by a L1 control parameter to have one of 12, 24, 36, and 48.

In Equation 1 above, a subcarrier position $\tilde{n}_{sc}^{RA}(0)$ with an initial preamble symbol group 11 of a preamble sequence mapped thereto may be determined by $n_{init}$ selected in a MAC layer according to Equation 3 below.

$$\tilde{n}_{sc}^{RA}(0) = n_{init} \bmod N_{sc}^{RA} \quad \text{[Equation 3]}$$

In Equation 1 above, $\tilde{n}_{sc}^{RA}(i)$ of a remaining $i^{th}$ preamble symbol group that is not the initial preamble symbol group 11 may be represented according to Equation 4 below.

$$\tilde{n}_{sc}^{RA}(i) = \begin{cases} (\tilde{n}_{sc}^{RA}(0) + f(i/4)) \bmod N_{sc}^{RA} & i \bmod 4 = 0 \text{ and } i > 0 \\ \tilde{n}_{sc}^{RA}(i-1) + 1 & i \bmod 4 = 1, 3 \text{ and} \\ & \tilde{n}_{sc}^{RA}(i-1) \bmod 2 = 0 \\ \tilde{n}_{sc}^{RA}(i-1) - 1 & i \bmod 4 = 1, 3 \text{ and} \\ & \tilde{n}_{sc}^{RA}(i-1) \bmod 2 = 1 \\ \tilde{n}_{sc}^{RA}(i-1) + 6 & i \bmod 4 = 2 \text{ and} \\ & \tilde{n}_{sc}^{RA}(i-1) < 6 \\ \tilde{n}_{sc}^{RA}(i-1) - 6 & i \bmod 4 = 2 \text{ and} \\ & \tilde{n}_{sc}^{RA}(i-1) \geq 6 \end{cases} \quad \text{[Equation 4]}$$

When a random access preamble sequence of a terminal is repeatedly transmitted, it may be necessary to calculate $f(i/4)$ of Equation 4 above to determine a subcarrier index mapped to a first symbol group 15 of the repeatedly transmitted preamble sequence. $f(i/4)$ of Equation 4 above may be determined using a function of Equation 5 below.

$$f(t) = \left( f(t-1) + \left( \sum_{n=10t+1}^{10t+9} c(n) 2^{n-(10t+1)} \right) \bmod (N_{sc}^{RA} - 1) + 1 \right) \quad \text{[Equation 5]}$$

$$\bmod N_{sc}^{RA} \; f(-1) = 0$$

In Equation 5 above, a pseudo random sequence c(n) may be defined as a gold sequence of a length 31 and an output sequence c(n) with a length $M_{PN}$ may be defined according to Equation 6 below.

$$c(n) = (x_1)(n+N_C) + x_2(n+N_C)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2 \quad \text{[Equation 6]}$$

In Equation 6 above, n=0, 1, ..., $M_{PN}$−1, Nc=1600, a first m-sequence may be initialized with $x_1(0)=1$, $x_1(n)=0$, n=1, 2, ..., 30, and a second m-sequence may be represented according to $c_{init} = \sum_{i=0}^{30} x_2(i) \cdot 2^i$. In this case, $c_{init} = N_{ID}^{Ncell}$ may be defined and a cell unique ID value $N_{ID}^{Cell}$ may be given by a L1 control parameter.

To access a network through a NPRACH, a terminal may generate an initial preamble in a frequency domain and map the initial preamble to a subcarrier of a corresponding physical layer resource block (PRB). The initial preamble may be a preamble transmitted through an initial preamble symbol group of a random access preamble sequence and a subcarrier index with the initial preamble mapped thereto may correspond to a subcarrier index in which the initial preamble symbol group of the random access preamble sequence is transmitted and may be received from a L1 controller. When an initial preamble symbol is mapped to a corresponding subcarrier, that is, when a signal value in a frequency domain of a corresponding subcarrier is set to a value (0 or 1) corresponding to a preamble, the terminal may perform inverse fast Fourier transform (IFFT) to generate a time domain signal corresponding to one symbol period (8192*Ts). In addition, the time domain signal may be repeatedly disposed in a time domain five times to generate a time domain signal (hereinafter, referred to as a 'preamble sequence') corresponding to a preamble sequence period $T_{SEQ}$ of FIG. 1 and may combine a CP with the preamble sequence signal to generate a time domain signal corresponding to the initial preamble symbol group of the random access preamble sequence.

When the initial preamble symbol group is generated, the terminal may map a subcarrier to the three remaining preamble symbol group according to the aforementioned frequency hopping pattern and, then, generate a time domain signal via IFFT and CP insertion.

In addition, when a random access preamble needs to be repeatedly transmitted, four basic preamble symbol group signals generated using the aforementioned method may be repeatedly and continuously transmitted the number of repetition times. For example, when the number of repetition times is 8, a basic preamble sequence including four basic preamble symbol groups may be continuously and repeatedly transmitted 8 times in a time domain. With regard to NPRACH transmission, the number of repetition times of the basic preamble sequence may be a maximum of 128.

As described above, an exemplary embodiment of the present invention may provide a random access preamble detection apparatus and method for detecting a random access preamble sequence transmitted via a frequency hopping scheme using a single tone in a NB-IoT system and measuring timing offset of a corresponding preamble sequence, particularly, for improving the reliability of a detection sequence by lowering false alarm and miss detection probability during preamble detection and measuring timing offset of a predetermined range or more.

Hereinafter, a random access preamble detection apparatus and method according to an exemplary embodiment of the present invention will be described in detail with reference to necessary diagrams.

Figure 3:
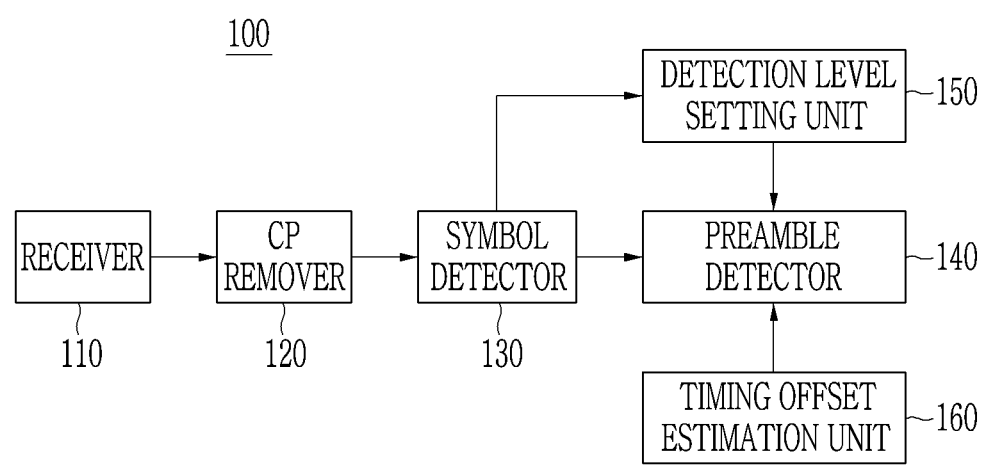
FIG. 3 is a schematic diagram showing a random access preamble detection apparatus according to an exemplary embodiment of the present invention.

FIG. 3 is a schematic diagram showing a random access preamble detection apparatus according to an exemplary embodiment of the present invention.

Referring to FIG. 3, a random access preamble detection apparatus 100 according to an exemplary embodiment of the present invention may include a receiver 110, a CP remover 120, a symbol detector 130, a preamble detector 140, a detection level setting unit 150, and a timing offset estimation unit 160.

The receiver 110 may include at least one antenna and receive a signal (hereinafter, referred to as a 'received signal') transmitted from a terminal through a NPRACH.

The CP remover 120 may remove a CP from a received signal that is received through the receiver 110 in a time domain and output the received signal. A length of the CP removed by the CP remover 120 may be determined based on NPRACH control information.

The NPRACH control information may be provided by a L1 controller and may include a cell ID of a corresponding cell, a PRB index, a NPRACH transmission period, a NPRACH frequency offset (subcarrier offset) information, a NPRACH format (preamble format), the number of times of repeated transmission of a NPRACH, transmission frame information in a NPRACH transmission period, and NPRACH subcarrier information (the number of subcarriers allocated to a NPRACH, etc.). The NPRACH format of the NPRACH control information may indicate length information of a CP.

When the NPRACH format indicates a CP length of 2048 Ts, the CP remover 120 may remove a CP corresponding to a period of 2048 Ts from a received signal. When the NPRACH format indicates a CP length of 8192 Ts, the CP remover 120 may remove a CP corresponding to a period of 8192 Ts from a received signal.

Upon receiving the received signal from which the CP is removed by the CP remover 120, the symbol detector 130 may detect symbols corresponding to each preamble sequence period $T_{SEQ}$ of a NPRACH by performing fast Fourier transform (FFT) on the received signal.

The symbol detector 130 may convert the received signal from which the CP is removed via 8192 point FFT into a frequency domain signal. When the time domain signal is converted into the frequency domain signal via 8192 point FFT, the time domain signal may be converted into the frequency domain signal in units of periods of 8192 Ts. That is, FFT may be performed on the received signal in units of periods of 8192 Ts corresponding to one symbol period to convert the received signal into a frequency domain signal.

Referring to FIG. 1 above, one preamble sequence period $T_{SEQ}$ in a NPRACH may include five symbol periods $T_{Symbol}$. In addition, each symbol period $T_{Symbol}$ may be configured to transmit the same preamble symbol and one symbol period $T_{Symbol}$ may be configured to has a length of 8192 Ts in a time domain.

Accordingly, the symbol detector 130 may generate a frequency domain signal with respect to each symbol period $T_{Symbol}$ via 8192 point FFT. In addition, five frequency domain signals corresponding to the same preamble sequence period $T_{SEQ}$ among the FFT-transformed frequency domain signals may be combined to detect one symbol with respect to each preamble sequence period $T_{SEQ}$. The symbol detector 130 may combine five symbol period signals belonging to the same preamble sequence period $T_{SEQ}$ to generate one symbol period signal prior to FFT transformation instead of after FFT transformation and, then, perform FFT on the one symbol period signal with respect to each preamble sequence period $T_{SEQ}$ to detect one symbol.

Upon acquiring symbols corresponding to each preamble sequence period $T_{SEQ}$ from the symbol detector 130, the preamble detector 140 may map the symbols to corresponding subcarrier indexes. That is, the preamble detector 140 may map symbols detected from the received signal to an index of a subcarrier used to transmit each symbol. The preamble detector 140 may detect a symbol transmitted through each subcarrier and map the symbol to a corresponding subcarrier every input slot (which corresponds to a period in which one preamble symbol group is transmitted).

Upon completely matching the symbols detected from the received signal with a subcarrier, the preamble detector 140 may extract only 48 symbols corresponding to 48 subcarriers allocated to a NPRACH among all uplink available resources. Positions of the 48 subcarriers allocated to a NPRACH may be acquired from a PRB index included in the NPRACH control information. That is, the preamble detector 140 may acquire a control parameter (nprach PRB) corresponding to a start position of 48 subcarriers allocated for a NPRACH among all uplink available resources from a PRB index included in the NPRACH control information and select 48 sequences corresponding to the NPRACH PRB based on the control parameter.

Figure 4:
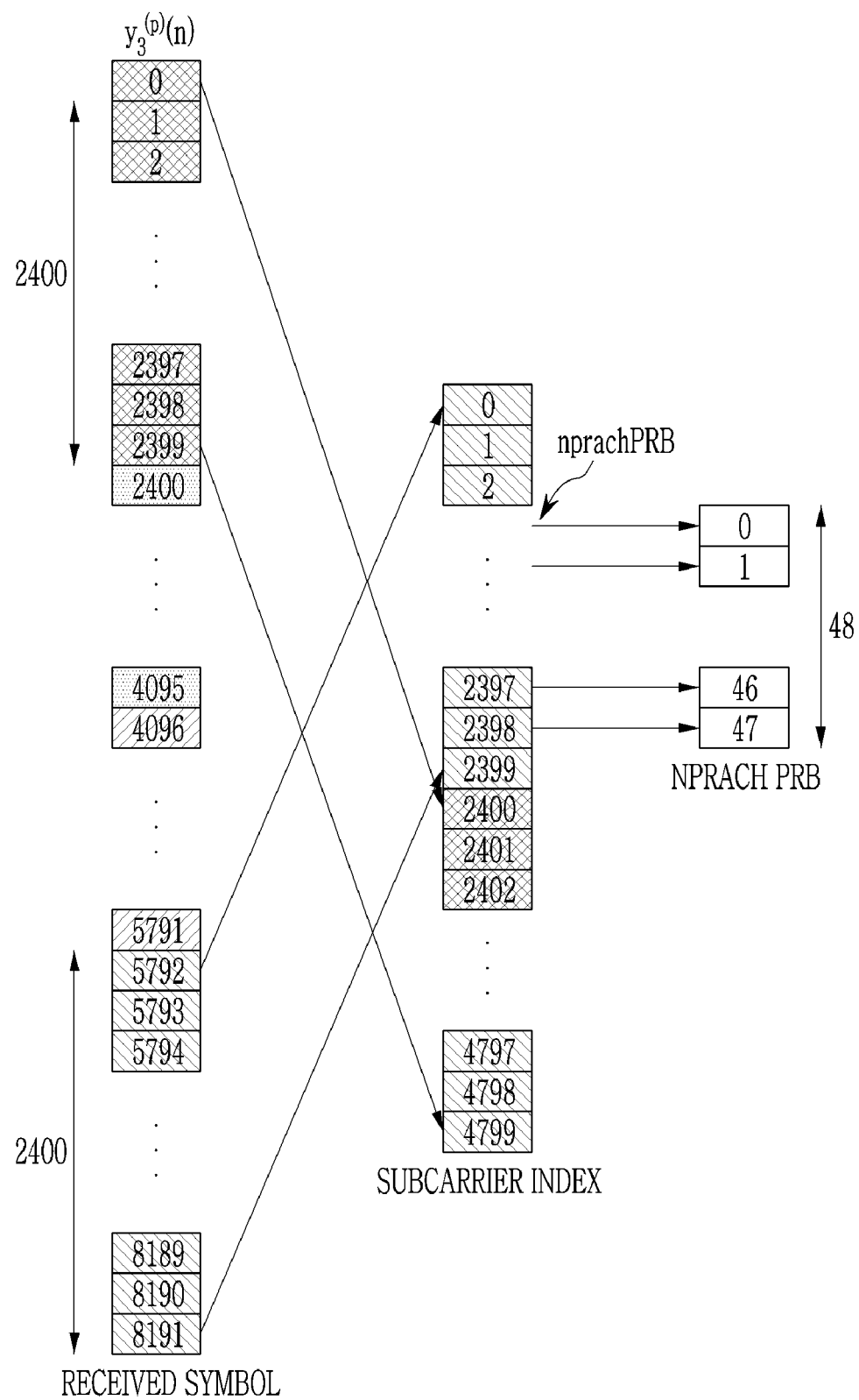
FIG. 4 is a diagram showing an example of a case in which a random access preamble detection apparatus 100 selects 48 sequences estimated as a NPRACH PRB according to an exemplary embodiment of the present invention.

FIG. 4 is a diagram showing an example of a case in which a random access preamble detection apparatus 100 selects 48 sequences estimated as a NPRACH PRB according to an exemplary embodiment of the present invention. Referring to FIG. 4, the preamble detector 140 may map symbols (hereinafter, referred to as a 'received symbol') detected from a received signal to respective corresponding subcarriers and, then, extract only 48 received symbols corresponding to a NPRACH PRB among the received symbols based on the control parameter nprachPRB.

The preamble detector 140 may extract 48 symbols received through 48 subcarriers allocated to a NPRACH every input slot using the aforementioned method and measure reception power of each of the extracted 48 symbols every input slot. In addition, reception power of the extracted 48 symbols may be accumulated based on a frequency hopping pattern that is determined every input slot.

Referring to FIG. 2, a random access preamble sequence of a NPRACH may basically include four preamble symbol groups transmitted through four slots that are continuously present and may be configured every four slots by repeating four preamble symbol groups the number of repetition times.

Referring to Equations 1 to 6 above, a frequency hopping pattern of four preamble symbol groups that are continuously present with respect to twelve subcarriers with indexes of #0 to #11 may be defined according to PRACH_SC_HOPPING[12][4]={{0, 1, 7, 6}, {1, 0, 6, 7}, {2, 3, 9, 8}, {3, 2, 8, 9}, {4, 5, 11, 10}, {5, 4, 10, 11}, {6, 7, 1, 0}, {7, 6, 0, 1}, {8, 9, 3, 2}, {9, 8, 2, 3}, {10, 11, 5, 4}, {11, 10, 4, 5}}. In a NB-IoT system, a terminal may transmit a preamble sequence in twelve subcarriers allowed to the terminal among 48 subcarriers allocated to a NPRACH. PRACH_SC_HOPPING[12][4] may represent a frequency hopping pattern with respect to a case in which twelve subcarriers with indexes of #0 to #11 are allowed to a terminal.

Referring to PRACH_SC_HOPPING[12][4], in a preamble sequence with an initial preamble symbol group mapped to #0 subcarrier, next remaining preamble symbol groups may be hopped and transmitted in #1 subcarrier, #7 subcarrier, and #6 subcarrier according to a frequency hopping pattern. Accordingly, the preamble detector 140 may determine that symbols corresponding to #0 subcarrier in an initial preamble symbol group, #1 subcarrier in a second preamble symbol group, #7 subcarrier in a third preamble symbol group, and #6 subcarrier in a fourth preamble symbol group correspond to the same preamble sequence and combine and accumulate reception power of the symbols. In this case, the accumulated value of the calculated reception power may be mapped to #0 subcarrier to which an initial preamble symbol group of a corresponding preamble sequence is mapped.

In addition, in a preamble sequence with an initial preamble symbol group mapped to #1 subcarrier, next remaining preamble symbol groups may be hopped and transmitted in #0 subcarrier, #6 subcarrier, and #7 subcarrier according to a frequency hopping pattern. Accordingly, the preamble detector 140 may determine that symbols corresponding to #1 subcarrier in an initial preamble symbol group, #0 subcarrier in a second preamble symbol group, #6 subcarrier in a third preamble symbol group, and #7 subcarrier in a fourth preamble symbol group correspond to the same preamble sequence and combine and accumulate reception power of the symbols. In this case, the accumulated value of the calculated reception power may be mapped to #1 subcarrier to which an initial preamble symbol group of a corresponding preamble sequence is mapped.

The preamble detector 140 may calculate an accumulated value of reception power during four input slots with respect to each of 48 subcarriers allocated to a NPRACH using the method. In this case, to prevent confusion due to frequency hopping, the accumulated value of reception power with respect to each preamble sequence may be mapped to a subcarrier index with a corresponding initial preamble symbol group mapped thereto.

Referring to Equations 1 to 6 above, when a preamble sequence is repeatedly transmitted, a subcarrier index of a first preamble symbol group may be determined by a cell ID parameter based on the aforementioned 31-gold sequence from secondary transmission. In addition, when the subcarrier index of the first preamble symbol group is determined, indexes of three preamble symbol groups that are continuously present may be determined based on the aforementioned PRACH_SC_HOPPING[12][4].

Figure 5:
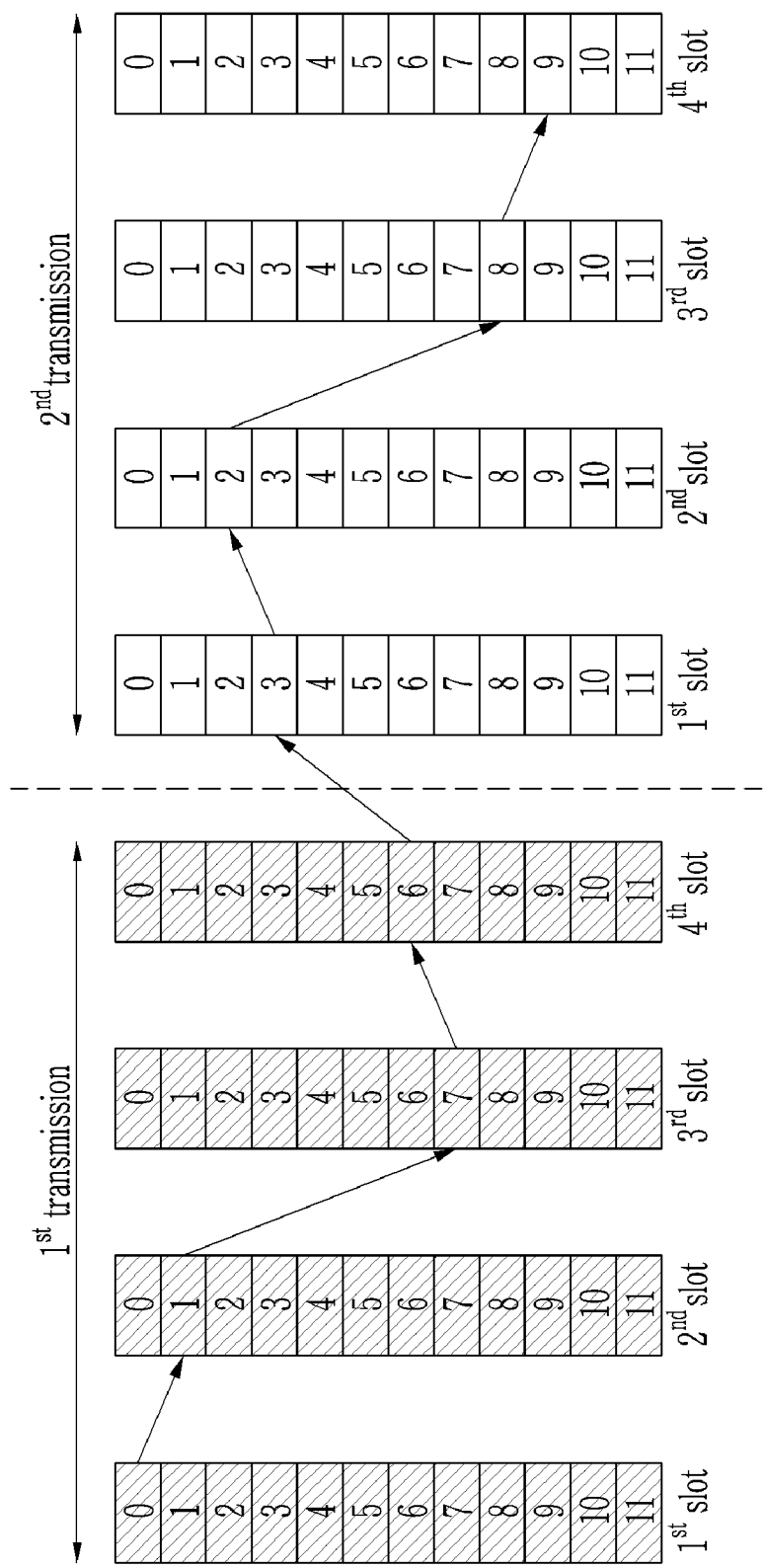
FIG. 5 is a diagram showing an example of a frequency hopping pattern of a case in which a preamble sequence in a NB-IoT system is repeatedly transmitted.

FIG. 5 is a diagram showing an example of a frequency hopping pattern of a case in which a preamble sequence is repeatedly transmitted.

For example, referring to FIG. 5, a first preamble symbol group that is mapped to #0 subcarrier and transmitted during initial transmission may be mapped to #3 subcarrier during secondary transmission and, accordingly, second, third, and fourth preamble symbol groups during secondary transmission may be mapped to #2, #8, and #9 subcarriers, respectively. Accordingly, the preamble detector 140 may select symbols that correspond to #0, #1, #7, and #6 subcarriers, respectively, in #1 to #4 input slots corresponding to initial transmission and select symbols that correspond to #3, #2, #8, and #9 subcarriers, respectively, in #1 to #4 input slots corresponding to secondary transmission to calculate an accumulated value of reception power. In this case, the accumulated value of the calculated reception power may be mapped to #0 subcarrier to which an initial preamble symbol group of a corresponding preamble sequence is mapped.

Upon completely accumulating reception power according to a frequency hopping pattern with respect to 48 subcarriers allocated to a NPRACH using the aforementioned method, the preamble detector 140 may compare the accumulated value of reception power corresponding to each subcarrier and a detection level and select a subcarrier estimated to be used to transmit a preamble of an actual terminal. That is, the preamble detector 140 may determine that a subcarrier, a corresponding accumulated value of reception power of which is greater than a detection level, is used to transmit a preamble among 48 subcarriers allocated to a NPRACH.

As described above, upon determining a subcarrier index estimated to be used to actually transmit a preamble sequence among 48 subcarriers allocated to a NPRACH, the preamble detector 140 may detect a preamble sequence received through a NPRACH based on the subcarrier index. In addition, the number of preamble sequences detected from a NPRACH and subcarrier indexes in which a preamble sequence is detected may be transmitted to a L1 controller (not shown) of a NB-IoT system for a subsequent random access procedure.

The random access preamble detection apparatus 100 may control a detection level adaptively for a NPRACH environment through the detection level setting unit 150 to lower false alarm and miss detection probability.

The detection level setting unit 150 may calculate an accumulated value of reception power according to a frequency hopping pattern with respect to remaining subcarriers except for 48 subcarriers allocated to a NPRACH among all 4800 available subcarriers and set a detection level based on the accumulated value of reception power.

That is, the detection level setting unit 150 may determine a detection level $Th_P$ from reception power sum $P_1 + P_2, \ldots, P_N$ corresponding to N subcarriers that are not allocated to a NPRACH according to Equation 7 below.

$$Th_P = \left\{ \frac{P_1 + P_2 + P_3 + \ldots + P_N}{N} \right\} \times W \qquad \text{[Equation 7]}$$

In Equation 7 above, $P_1, P_2, P_3, \ldots, P_N$ represent accumulated values of reception power, which correspond to N subcarriers, respectively. W is a weight value having a specific constant value and may be set to a value for enhancing detection probability through an experiment.

Referring to Equation 7 above, the detection level setting unit 150 may calculate the accumulated values of reception power average of N subcarriers that are not used to transmit a preamble sequence and set a detection level to a specific position point with respect to an average calculated via the weight value W.

The detection level setting unit 150 may determine a detection level $Th_P$ as shown in Equation 7 above from reception power corresponding to N subcarriers in which a preamble sequence is not detected by the preamble detector 140 among 48 subcarriers calculated from a PRB index. In this case, the preamble detector 140 may preferentially detect a preamble sequence using a predetermined detection level as a default value and, then, when the detection level setting unit 150 re-sets a detection level using the preamble sequence, the preamble detector 140 may re-perform a preamble detection procedure using a corrected detection level.

The detection level setting unit 150 may calculate an average of at least one accumulated value of reception power selected in descending order and at least one accumulated value of reception power selected in ascending order from final accumulated values of reception power corresponding to subcarriers (minimum 12 and maximum 48) allocated to a NPRACH and final accumulated values of reception power corresponding to remaining subcarriers except for subcarriers (minimum 12 and maximum 48) allocated to a NPRACH among all uplink available subcarriers and set a detection level as a specific position point with respect to the calculated average using the weight value.

The detection level setting unit 150 may select values equal to or greater than a specific value among final accumulated values of reception power corresponding to subcarriers (minimum 12 and maximum 48) allocated to a NPRACH and set a detection level as a specific position point of a highest accumulated value of reception power thereamong.

The detection level setting unit 150 may set a detection level to have different values depending on the number of preamble sequences that are simultaneously detected from a NPRACH. In this case, the detection level setting unit 150 may adjust a value of the weight value W in Equation 7 above depending on the number of preamble sequences that are simultaneously detected from a NPRACH to adjust a detection level. As such, when re-setting a detection level depending on the number of preamble sequences that are simultaneously detected from a NPRACH, the preamble detector 140 may re-perform a preamble detection procedure using a corrected detection level.

When the preamble detector 140 detects a preamble sequence, the random access preamble detection apparatus 100 may estimate timing offset of a corresponding preamble sequence through the timing offset estimation unit 160.

The timing offset estimation unit 160 may preferentially perform N point IFFT on twelve subcarriers used to transmit a preamble sequence by a terminal to estimate the timing offset of the preamble sequence transmitted from the terminal. The terminal may be allowed to transmit a random access preamble thereof only in twelve subcarriers among 48 subcarriers allocated to a NPRACH. Accordingly, the timing offset estimation unit 160 may verify the twelve subcarriers allocated to the terminal from the preamble sequences detected by the preamble detector 140 and perform Npoint IFFT on the twelve subcarriers.

During estimation of timing offset, when IFFT is performed using all values including values of subcarriers that are not used to transmit a preamble sequence, a noise component other than an actual preamble sequence may be applied to estimation of timing offset to deteriorate timing offset estimation performance.

Accordingly, the timing offset estimation unit 160 may perform IFFT using only a value of a subcarrier estimated to be used to actually transmit a preamble sequence of a terminal every slot. In this case, the timing offset estimation unit 160 may perform IFFT after filling corresponding signal values with 0 (Null) with respect to the remaining subcarriers determined not to be used to actually transmit a preamble sequence.

For example, when the terminal transmits a preamble sequence only once and maps an initial preamble symbol group to #3 subcarrier, the timing offset estimation unit 160 may fill values of remaining subcarriers except for #3 subcarrier corresponding to a first preamble symbol group, #2 subcarrier corresponding to a second preamble symbol group, #8 subcarrier corresponding to a third preamble symbol group, and #9 subcarrier corresponding to a fourth preamble symbol group with 0 based on PRACH_SC_HOPPING[12][4] that is a frequency hopping pattern and, then, perform IFFT.

For example, when the terminal transmits a preamble sequence twice and maps an initial preamble symbol group to #0 subcarrier, the timing offset estimation unit 160 may fill remaining subcarriers except for #0 subcarrier corresponding to a first preamble symbol group, #1 subcarrier corresponding to a second preamble symbol group, #7 subcarrier corresponding to a third preamble symbol group, and #6 subcarrier corresponding to a fourth preamble symbol group during primary transmission and #3 subcarrier corresponding to a first preamble symbol group, #2 subcarrier corresponding to a second preamble symbol group, #8 subcarrier corresponding to a third preamble symbol group, and #9 subcarrier corresponding to a fourth preamble symbol group during secondary transmission, with 0 and, then, perform IFFT. Accordingly, the timing offset estimation unit 160 may fill values of #4, #5, #10, and #11 except for #0, #1, #7, #6, #3, #2, #8, and #9 among the twelve subcarriers with 0 and, then, perform IFFT.

When transmitting preamble symbol groups corresponding to the same preamble sequence in one subcarrier twice or more due to repeated transmission during frequency hopping, the timing offset estimation unit 160 may normalize values of corresponding subcarriers, that is, may divide values of the corresponding subcarriers by the number of repeated mapping times and use the result value in IFFT.

Upon completely performing IFFT using the aforementioned method, the timing offset estimation unit 160 may measure energy (power) of a time domain signal generated as the IFFT result and estimate timing offset from an index of a time period with maximum energy.

The timing offset estimation unit 160 may perform the aforementioned timing offset estimation procedure on each preamble sequence detected by the preamble detector 140. In addition, the timing offset estimation unit 160 may transmit timing offset corresponding to each preamble sequence to a L1 controller (not shown) to correct timing of a preamble sequence.

When it is necessary to estimate timing offset for cell coverage extended in a NB-IoT system, the timing offset estimation unit 160 may estimate timing offset using even a sequence period as a CP period. That is, when removing a CP period from a received signal to estimate timing offset, the timing offset estimation unit 160 may remove the CP period using even some preamble sequence period as a CP period.

Figure 6:
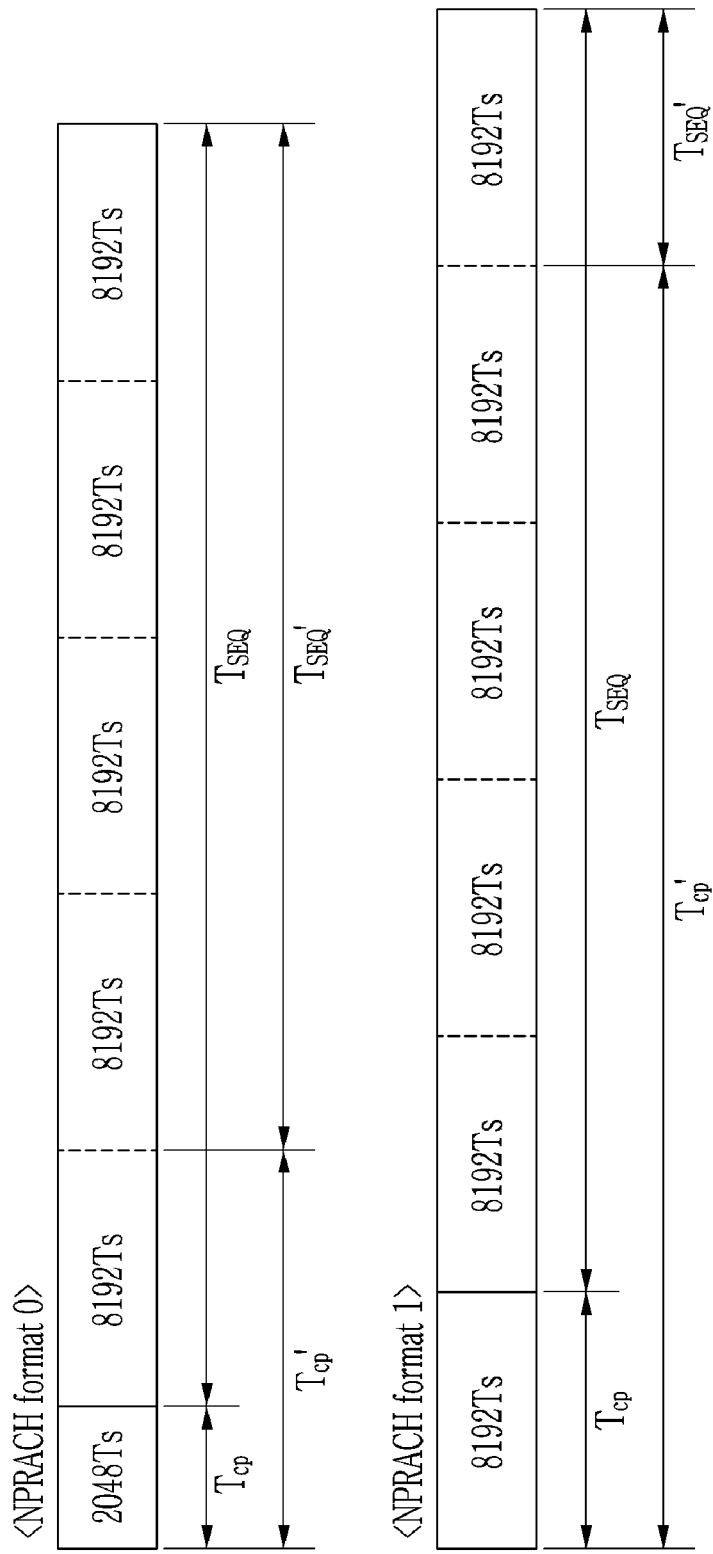
FIG. 6 is a diagram showing examples of a case in which a timing offset estimation unit extends and uses a CP period to estimate timing offset with respect to extended cell coverage according to an exemplary embodiment of the present invention.

FIG. 6 is a diagram showing examples of a case in which a timing offset estimation unit extends and uses a CP period to estimate timing offset with respect to extended cell coverage according to an exemplary embodiment of the present invention.

Referring to FIG. 6, the timing offset estimation unit 160 may extend and use a CP period $T_{CP}$ of a NPRACH signal to a portion of a preamble sequence period $T_{SEQ}$ during estimation of timing offset. For example, when a NPRACH preamble format is 0, the timing offset estimation unit 160 may extend and use a CP period $T_{CP'}$ to 2048 Ts+(N*8192 Ts) to estimate longer timing offset than a conventional CP period that is 2048 Ts and to apply the estimation result to the extended cell coverage. For example, when a NPRACH preamble format is 1, the timing offset estimation unit 160 may extend and use a CP period to 8192 Ts+(N*8192 Ts) to estimate longer timing offset than a conventional CP period that is 8192 Ts. Here, N may have only one value of 1, 2, 3 and 4.

The random access preamble detection apparatus 100 with the aforementioned structure may be embodied in a base station in a NB-IoT system.

In the random access preamble detection apparatus 100 with the aforementioned structure, functions of the receiver 110, the CP remover 120, the symbol detector 130, the preamble detector 140, the detection level setting unit 150, and the timing offset estimation unit 160 may be performed by one or more central processing units (CPUs) or processors embodied as other chip sets, a micro processor, or the like.

Figure 7:
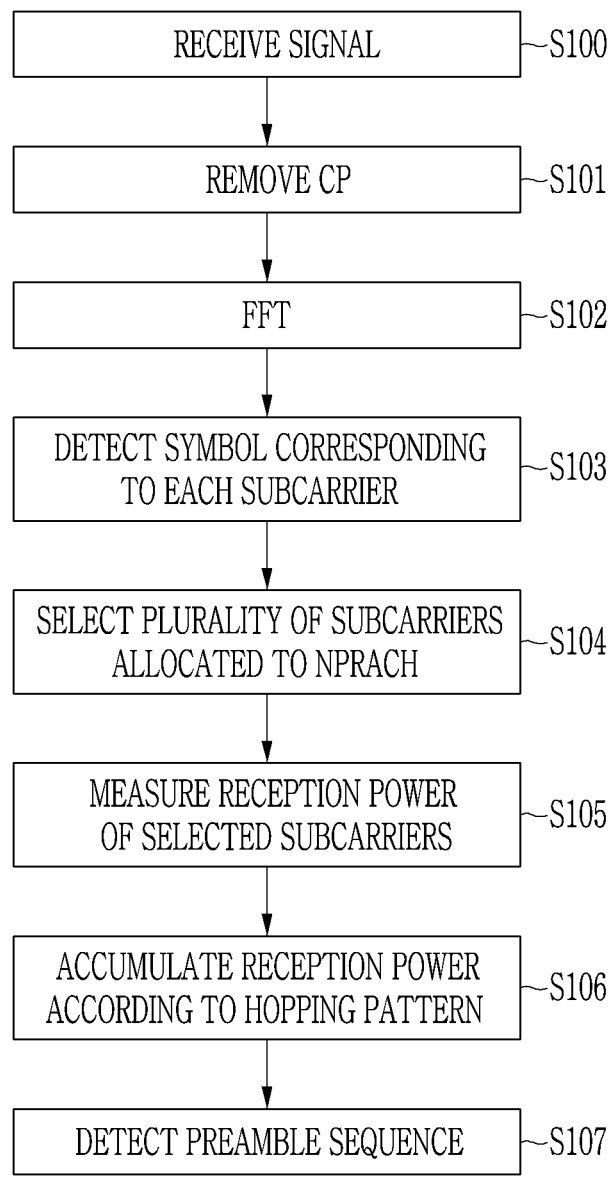
FIG. 7 is a schematic diagram showing a method of detecting a random access preamble by a random access preamble detection apparatus according to an exemplary embodiment of the present invention.

FIG. 7 is a schematic diagram showing a method of detecting a random access preamble by a random access preamble detection apparatus according to an exemplary embodiment of the present invention.

Referring to FIG. 7, upon receiving a signal from a terminal (S100), the random access preamble detection apparatus 100 according to an exemplary embodiment of the present invention may remove a CP from a received signal to output the signal (S101).

In operation S101, a length of the CP removed from the received signal may be changed according to a NPRACH format that is NPRACH control information. When a NPRACH format indicates a CP length of 2048 Ts, the random access preamble detection apparatus 100 may remove a CP corresponding to a period of 2048 Ts from the received signal. When a NPRACH format indicates a CP length of 8192 Ts, the random access preamble detection apparatus 100 may remove a CP corresponding to a period of 8192 Ts from the received signal.

In operation S101, when it is necessary to estimate timing offset for extended cell coverage, the random access preamble detection apparatus 100 may extend a CP period $T_{CP}$ of a NPRACH signal to a portion of a preamble sequence period $T_{SEQ}$. For example, when a NPRACH preamble format is 0, the random access preamble detection apparatus 100 may extend the CP period $T_{CP}$, to 2048 Ts+(N*8192 Ts). For example, when a NPRACH preamble format is 1, the random access preamble detection apparatus 100 may extend a CP period to 8192 Ts+(N*8192 Ts). As such, when the CP period is extended to a partial preamble sequence period, the random access preamble detection apparatus 100 may remove a signal corresponding to the extended CP period from the received signal during removal of a CP through operation S101.

Then, the random access preamble detection apparatus 100 may perform FFT on the received signal from which the CP is removed (S102) to detect a symbol corresponding to each subcarrier included in an uplink available resource (S103).

In operations S102 and S103, the random access preamble detection apparatus 100 may generate a frequency domain signal with respect to each symbol period $T_{Symbol}$ via 8192 point FFT. In addition, five frequency domain signals corresponding to the same preamble sequence period $T_{SEQ}$ among the FFT-transformed frequency domain signals may be combined to detect a symbol corresponding to each preamble sequence period $T_{SEQ}$ and the symbol may be mapped to a corresponding subcarrier index.

In operations S102 and S103, the random access preamble detection apparatus 100 may combine five symbol period signals belonging to the same preamble sequence period $T_{SEQ}$ to generate one symbol period signal prior to FFT transformation instead of after FFT transformation and, then, perform FFT on the one symbol period signal to detect a symbol corresponding to each preamble sequence period $T_{SEQ}$ and map the symbol to a corresponding subcarrier index.

Upon completely matching the symbols detected from the received signal with a subcarrier, the random access preamble detection apparatus 100 may select subcarriers allocated to a NPRACH among all uplink available resources (S104) and measure reception power of symbols mapped to the selected subcarriers (S105).

In operation S104, positions of 48 subcarriers allocated to a NPRACH may be acquired from a PRB index included in NPRACH control information. The random access preamble detection apparatus 100 may acquire a control parameter (nprach PRB) corresponding to a start position of 48 subcarriers allocated for a NPRACH among all uplink available resources from a PRB index included in the NPRACH control information and select 48 sequences corresponding to the NPRACH PRB based on the control parameter.

In operation S105, the random access preamble detection apparatus 100 may measure reception power every input slot with respect to symbols receives through subcarriers allocated to a NPRACH. In addition, reception power of subcarriers allocated to a NPRACH may be accumulated based on a frequency hopping pattern predetermined every input slot (S106).

In operation S106, to prevent confusion due to frequency hopping, the random access preamble detection apparatus 100 may map the accumulated value of reception power with respect to each preamble sequence to a subcarrier index with a corresponding initial preamble symbol group mapped thereto.

Upon completely accumulating reception power according to a frequency hopping pattern with respect to subcarriers allocated to a NPRACH, the random access preamble detection apparatus 100 may detect a preamble sequence transmitted by a terminal based on the accumulation result (S107).

In operation S107, upon completely accumulating reception power according to a frequency hopping pattern with respect to 48 subcarriers allocated to a NPRACH, the random access preamble detection apparatus 100 may compare an accumulated value of reception power corresponding to each subcarrier and a detection level. In addition, a subcarrier, a corresponding accumulated value of reception power of which is greater than a detection level, among 48 subcarriers allocated to a NPRACH may be determined to be used to transmit a preamble sequence of a terminal and the preamble sequence of the terminal may be detected from the subcarrier.

The random access preamble detection apparatus 100 may control a detection level that is a reference for detection of the preamble sequence of the terminal in operation S107, adaptively for a NPRACH environment to lower false alarm and miss detection probability.

Figure 8:
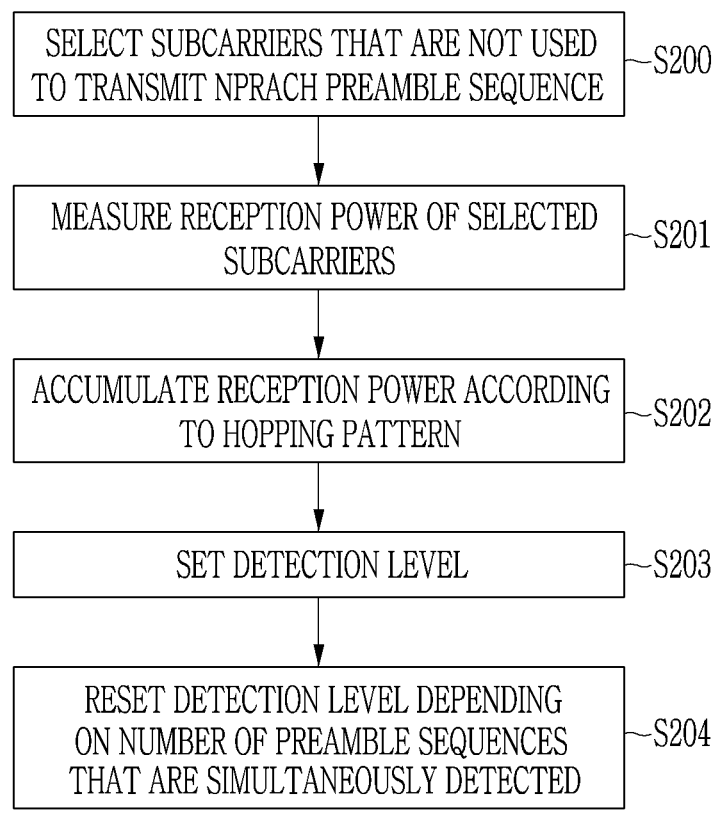
FIG. 8 is a schematic diagram of a method of setting a detection level of a random access preamble detection apparatus according to an exemplary embodiment of the present invention.

FIG. 8 is a schematic diagram of a method of setting a detection level of a random access preamble detection apparatus according to an exemplary embodiment of the present invention.

Referring to FIG. 8, upon completely matching symbols detected from a received signal with a subcarrier through the aforementioned operations S100 to S103 of FIG. 7, the random access preamble detection apparatus 100 according to an exemplary embodiment of the present invention may select N subcarriers that are not allocated to transmit a NPRACH preamble sequence among all uplink available resources (S200) and measure reception power of symbols mapped to the selected subcarriers (S201).

Using a similar method as the aforementioned S106 of FIG. 7, reception power of the subcarriers selected through operation S200 may be accumulated (S202) and a detection level may be set based on the accumulated reception power (S203).

In operation S200, the random access preamble detection apparatus 100 may select remaining subcarriers except for 48 subcarriers allocated to a NPRACH among all 4800 uplink available subcarriers.

In operation S200, the random access preamble detection apparatus 100 may select remaining subcarriers except for twelve subcarriers allocated to transmit a preamble sequence of a terminal among 48 subcarriers allocated to a NPRACH.

In operation S203, the random access preamble detection apparatus 100 may calculate an average of accumulated values of reception power of the N subcarriers selected through operation S200 and set a detection level as a specific position point with respect to the calculated average.

Upon detecting a preamble sequence through the aforementioned operation S107 of FIG. 7, the random access preamble detection apparatus 100 may reset a detection level depending on the number of preamble sequences that are simultaneously detected in a NPRACH (S204).

Upon resetting the detection level in operation S204, the random access preamble detection apparatus 100 may re-perform a preamble detection procedure using a corrected detection level.

Figure 9:
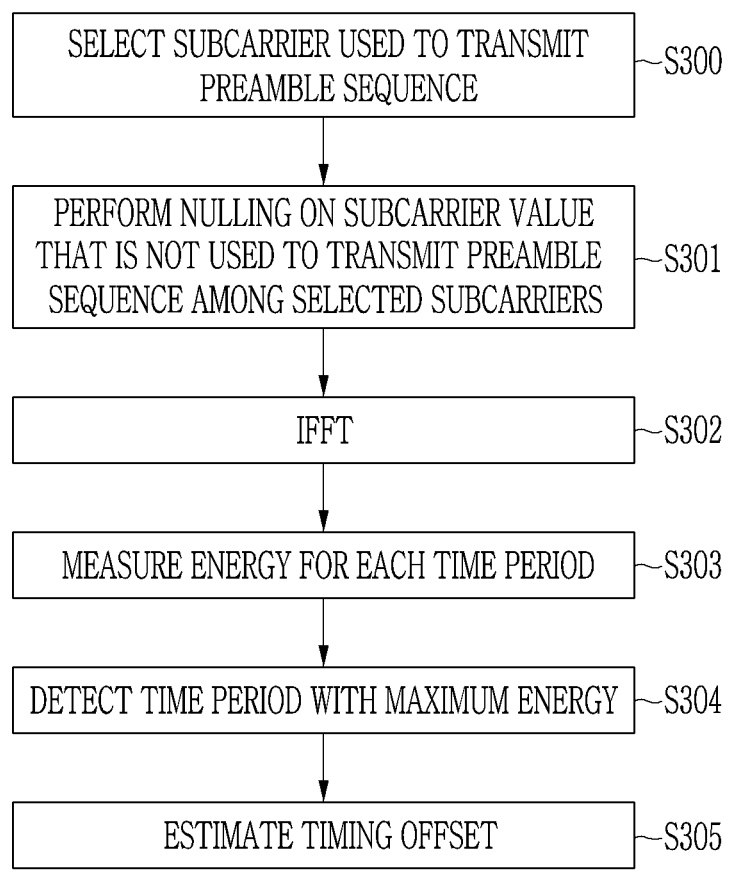
FIG. 9 is a schematic diagram showing a method of estimating timing offset of a random access preamble detection apparatus according to an exemplary embodiment of the present invention.

FIG. 9 is a schematic diagram showing a method of estimating timing offset of a random access preamble detection apparatus according to an exemplary embodiment of the present invention.

Referring to FIG. 9, upon completely detecting a preamble sequence through the aforementioned operations S100 to S107 of FIG. 7, the random access preamble detection apparatus 100 according to an exemplary embodiment of the present invention may select subcarriers allocated to transmit a random access preamble of a terminal based on a position of a subcarrier in which a preamble sequence is detected (S300).

The terminal may be allowed to transmit a random access preamble thereof only in twelve subcarriers among 48 subcarriers allocated to a NPRACH. Accordingly, in operation S300, the random access preamble detection apparatus 100 may verify twelve subcarriers allowed to transmit the preamble sequence detected through the aforementioned operation S107 of FIG. 7 from a position of a subcarrier of the preamble sequence.

During estimation of timing offset, when IFFT is performed using all values including values of subcarriers that are not used to transmit a preamble sequence, a noise component other than an actual preamble sequence may be applied to estimation of timing offset to deteriorate timing offset estimation performance.

Accordingly, the random access preamble detection apparatus 100 may perform nulling of filling a corresponding signal value with 0(Null) with respect to remaining subcarriers to be determined not to be used to transmit a preamble sequence among the subcarriers selected through operation S300 (S301) and, then, perform IFFT using only a value of a subcarrier estimated to actually deliver a preamble sequence (S302).

In operation S302, when transmitting preamble symbol groups corresponding to the same preamble sequence in one subcarrier twice or more due to repeated transmission during frequency hopping, the random access preamble detection apparatus 100 may normalize values of corresponding subcarriers, that is, may divide values of the corresponding subcarriers by the number of repeated mapping times and use the result value in IFFT.

Upon generating a time domain signal via IFFT, the random access preamble detection apparatus 100 may measure energy (power) of the time domain signal generated as the IFFT result every period (S303) and detect a time period with maximum energy (S304). In addition, timing offset may be estimated from an index of a time period with maximum energy (S305).

The random access preamble detection apparatus 100 may estimate timing offset with respect to all preamble sequences that are detected from a NPRACH through the aforementioned operations S301 to S304 and transmit timing offset corresponding to each preamble sequence to a L1 controller (not shown).

According to the aforementioned exemplary embodiment of the present invention, the random access preamble detection apparatus 100 may effectively detect a preamble sequence transmitted through a NPRACH using a single tone frequency hopping method from a terminal in a NB-IoT system. In addition, it may be possible to simultaneously track all preamble sequences that are simultaneously transmitted through a NPRACH.

A NPRACH environment and a detection level that is optimized depending on the number of preamble sequences that are simultaneously transmitted may be set to remarkably lower false alarm and miss detection probability.

Only a value of a subcarrier used to actually transmit a preamble may be used during estimation of timing offset to remarkably lower an estimation error of timing offset.

In addition, a CP period may be extended and used to estimate timing offset and, thus, long timing offset may be estimated and may be applied to an extended cell coverage region.

An exemplary embodiment of the present invention may not be embodied only by the aforementioned apparatus and/or method and may be embodied through a program for performing a function corresponding to a configuration according to an exemplary embodiment of the present invention or a recording medium with the program recorded thereon and the embodiments may be easily implemented by one of ordinary skill in the art of the present invention from the disclosure of the aforementioned exemplary embodiments.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A random access preamble detection method of a base station, the method comprising:
removing a cyclic prefix (CP) from a received signal;
detecting a plurality of first symbols corresponding to a plurality of first subcarriers included in an uplink available resource from the received signal with the CP removed;
measuring reception power of the first symbol corresponding to each of a plurality of second subcarriers allocated to a random access channel among the plurality of first subcarriers;
accumulating reception power with respect to each of the plurality of second subcarriers according to a predetermined frequency hopping pattern; and
upon completely accumulating reception power according to the frequency hopping pattern, detecting a preamble sequence using each accumulated value of reception power of each of the plurality of second subcarriers.

2. The method of claim 1, wherein
the detecting of the plurality of first symbols includes:
performing fast Fourier transform (FFT) on the received signal with the CP removed therefrom to generate a frequency domain signal corresponding to each of a plurality of symbol periods belonging to one preamble sequence period;
combining a plurality of frequency domain signals corresponding to the plurality of symbol periods; and
detecting the plurality of first symbols from a signal with which the plurality of frequency domain signals are combined.

3. The method of claim 1, wherein
the detecting of the plurality of first symbols includes:
detecting a plurality of first symbol period signals belonging to one preamble sequence period from the received signal with the CP removed therefrom;
combining the plurality of first symbol period signals to generate a second symbol period signal;
performing FFT on the second symbol period signal to generate a frequency domain signal; and
detecting the plurality of first symbol from the frequency domain signal.

4. The method of claim 1, wherein:
the accumulating includes:
accumulating reception power of each of the plurality of second subcarriers based on subcarrier mapping information of a case in which the first symbol corresponds to an initial symbol group included in a preamble sequence; and
mapping the accumulated values of reception power to each of the plurality of second subcarriers based on subcarrier mapping information of a case in which the first symbol corresponds to an initial symbol group included in a preamble sequence.

5. The method of claim 1, further comprising:
accumulating reception power of a remaining plurality of third subcarriers except for the plurality of second subcarriers among the plurality of first subcarrier according to the frequency hopping pattern; and
setting a detection level of the preamble sequence using an accumulated value of reception power of the plurality of third subcarriers.

6. The method of claim 1, further comprising
setting a detection level of the preamble sequence using the accumulated value of reception power of the remaining part excluding a plurality of third subcarriers used to transmit the preamble sequence among the plurality of second subcarriers.

7. The method of claim 1, further comprising:
accumulating reception power of remaining except for the plurality of second subcarriers among the plurality of first subcarriers according to the frequency hopping pattern; and
setting a detection level of the preamble sequence using an accumulated value of reception power of a plurality of third subcarrier selected at descending order of the accumulated value of reception power among the plurality of first subcarriers and a plurality of fourth subcarriers that are selected in ascending order of the accumulated value of reception power among the plurality of first subcarriers.

8. The method of claim 1, further comprising
resetting a detection level of the preamble sequence depending on the number of preamble sequences that are simultaneously detected in the random access channel.

9. A timing estimation method of a random access preamble of a base station, the method comprising:
removing a cyclic prefix (CP) from a received signal;
detecting a plurality of first symbols corresponding to a plurality of first subcarriers allocated to a random access channel from the received signal with the CP removed;
accumulating reception power of the first symbol corresponding to each of the plurality of first subcarriers according to a frequency hopping pattern;
detecting a plurality of second subcarriers allowed to a terminal to transmit a preamble sequence using each of accumulated values of reception power of the plurality of first subcarriers;
performing inverse fast Fourier transform (IFFT) using a plurality of third subcarriers used to transmit the preamble sequence among the plurality of second subcarriers; and
estimating timing offset of the preamble sequence based on a time domain signal with maximum energy among a plurality of time domain signals generated as a result of the IFFT.

10. The method of claim 9, wherein:
the removing of the CP includes:
extending a CP period to a portion of a preamble sequence period; and
removing the CP from the received signal to correspond to the extended CP period.

11. The method of claim 9, wherein:
the performing of the IFFT includes:
performing nulling on remaining subcarriers except for the plurality of second subcarriers among the plurality of first subcarriers; and
performing the IFFT using a signal value of the plurality of second subcarrier after the nulling is performed.

12. The method of claim 9, further comprising
normalizing a value of at least one fourth subcarrier according to a number of repletion times when the at least one fourth subcarrier is repeatedly used among the plurality of third subcarriers to transmit the preamble sequence.

13. A random access preamble detection apparatus comprising:
a processor,
wherein the random access preamble detection apparatus is configured to:
remove a cyclic prefix (CP) from a received signal and to output the received signal;
detect a plurality of first symbols corresponding to a plurality of first subcarriers included in an uplink available resource from an output signal of the CP remover; and
accumulate reception power with respect to each of a plurality of second subcarriers allocated to a random access channel among the plurality of first subcarriers according to a predetermined frequency hopping pattern, and
upon completely accumulating reception power according to the frequency hopping pattern, detect a preamble sequence using each accumulated value of reception power of each of the plurality of second subcarriers.

14. The random access preamble detection apparatus of claim 13, wherein detecting the plurality of first symbols comprises:
performing a fast Fourier transform (FFT) on the received signal with the CP removed therefrom to generate a frequency domain signal corresponding to each of a plurality of symbol periods belonging to one preamble sequence period, and
detecting the plurality of first symbols from a signal formed by combining frequency domain signals corresponding to the plurality of symbol periods.

15. The random access preamble detection apparatus of claim 13, wherein detecting the plurality of first symbols comprises:
combining a plurality of first symbol period signals belonging to one preamble sequence period to generate a second symbol period signal in the received signal with the CP removed therefrom, and detecting the plurality of first symbol from a frequency domain signal generated by performing FFT on the second symbol period signal.

16. The random access preamble detection apparatus of claim 13, wherein accumulating the reception power comprises:

accumulating reception power of each of the plurality of second subcarriers based on subcarrier mapping information of a case in which the first symbol corresponds to an initial symbol group included in a preamble sequence, and mapping the accumulated values of reception power to each of the plurality of second subcarriers.

17. The random access preamble detection apparatus of claim 13, wherein the random access preamble detection apparatus is further configured to accumulate reception power of a remaining plurality of third subcarriers except for the plurality of second subcarriers among the plurality of first subcarrier according to the frequency hopping pattern and to set a detection level of the preamble sequence using an accumulated value of reception power of the plurality of third subcarriers.

18. The random access preamble detection apparatus of claim 13, wherein the random access preamble detection apparatus is further configured to set a detection level of the preamble sequence using the accumulated value of reception power of the remaining part excluding a plurality of third subcarriers used to transmit the preamble sequence among the plurality of second subcarriers.

19. The random access preamble detection apparatus of claim 13, wherein the random access preamble detection apparatus is further configured to accumulate reception power of remaining except for the plurality of second subcarriers among the plurality of first subcarriers according to the frequency hopping pattern and to set a detection level of the preamble sequence using an accumulated value of reception power of a plurality of third subcarrier selected at descending order of the accumulated value of reception power among the plurality of first subcarriers and a plurality of fourth subcarriers that are selected in ascending order of the accumulated value of reception power among the plurality of first subcarriers.

20. The random access preamble detection apparatus of claim 13, wherein the random access preamble detection apparatus is further configured to reset a detection level of the preamble sequence depending on the number of preamble sequences that are simultaneously detected in the random access channel.

* * * * *